US012679703B2

(12) United States Patent
Ohira

(10) Patent No.: US 12,679,703 B2
(45) Date of Patent: Jul. 14, 2026

(54) PERIPHERAL MONITORING SYSTEM FOR WORK MACHINE AND WORK MACHINE

(71) Applicant: SUMITOMO HEAVY INDUSTRIES, LTD., Tokyo (JP)

(72) Inventor: Yuki Ohira, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 95 days.

(21) Appl. No.: 18/397,096

(22) Filed: Dec. 27, 2023

(65) Prior Publication Data

US 2024/0217781 A1 Jul. 4, 2024

(30) Foreign Application Priority Data

Dec. 28, 2022 (JP) ................................ 2022-211937

(51) Int. Cl.
*B66C 13/16* (2006.01)
*B66C 13/46* (2006.01)

(52) U.S. Cl.
CPC .............. *B66C 13/16* (2013.01); *B66C 13/46* (2013.01)

(58) Field of Classification Search
CPC ......... B66C 13/16; B66C 13/46; B66C 23/36; B66C 13/22; B66C 23/62
See application file for complete search history.

(56) References Cited

U.S. PATENT DOCUMENTS

| | | | | |
|---|---|---|---|---|
| 9,751,731 B1 * | 9/2017 | Masar | ..................... | B66C 17/06 |
| 2023/0250617 A1 * | 8/2023 | Konda | .................... | E02F 9/264 702/97 |

FOREIGN PATENT DOCUMENTS

| | | | | |
|---|---|---|---|---|
| CN | 102785046 A * | 11/2012 | ............. | B25J 9/163 |
| JP | 2015-229836 A | 12/2015 | | |
| WO | WO-2016194426 A1 * | 12/2016 | ............... | G01S 7/40 |
| WO | WO-2023094516 A1 * | 6/2023 | ............ | B66C 13/48 |

* cited by examiner

*Primary Examiner* — Ig T An
(74) *Attorney, Agent, or Firm* — Michael Best & Friedrich LLP

(57) ABSTRACT

A peripheral monitoring system for a work machine includes a position measurement device that measures a position of an object, a position identifying member provided for the work machine, an acquisition unit that acquires position information of the position identifying member with the position measurement device, and an identifying unit that identifies a position of the position measurement device based on the position information acquired by the acquisition unit, in which the position identifying member is detachably installed on the work machine.

10 Claims, 6 Drawing Sheets

PERIPHERAL MONITORING SYSTEM FOR WORK MACHINE AND WORK MACHINE

CROSS-REFERENCE TO RELATED APPLICATIONS

This application claims priority to Japanese Patent Application No. 2022-211937, filed on Dec. 28, 2022, which is incorporated by reference herein in its entirety.

BACKGROUND

Technical Field

A certain embodiment of the present invention relates to a peripheral monitoring system for a work machine and a work machine.

Description of Related Art

In related art, a position measurement device (sensor such as LiDAR) is installed in a work machine in order to detect an object (person or obstacle) in a caution area (refer to the related art).

SUMMARY

According to an embodiment of the present invention, there is provided a peripheral monitoring system for a work machine including a position measurement device that measures a position of an object, a position identifying member provided for the work machine, an acquisition unit that acquires position information of the position identifying member with the position measurement device, and an identifying unit that identifies a position of the position measurement device based on the position information acquired by the acquisition unit. The position identifying member is detachably installed on the work machine.

DETAILED DESCRIPTION

In a case where the work machine receives a vibration or an impact generated by a work and the position measurement device deviates from an initial installation position (positional deviation and/or posture deviation), a detection result of the position measurement device deviates. Thus, it is necessary to correct the deviation of the position measurement device.

It is desirable to provide a peripheral monitoring system for a work machine and a work machine capable of more easily correcting a deviation of a position measurement device.

Hereinafter, an embodiment of a peripheral monitoring system for a work machine according to the present invention will be described in detail with reference to drawings.

Crane Configuration

Figure 1:
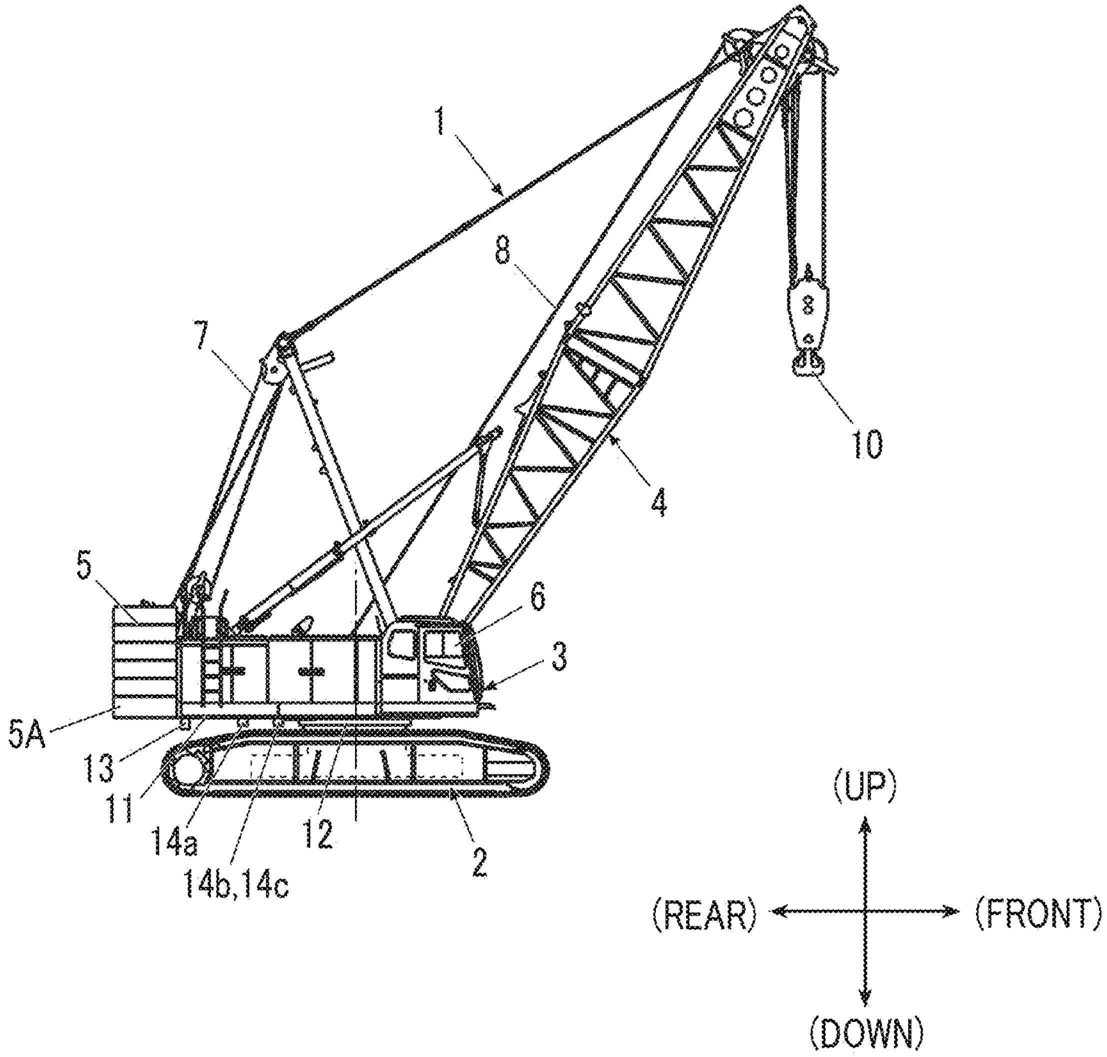
FIG. 1 is a side surface view of a crane as a work machine according to one embodiment.
Figure 2:
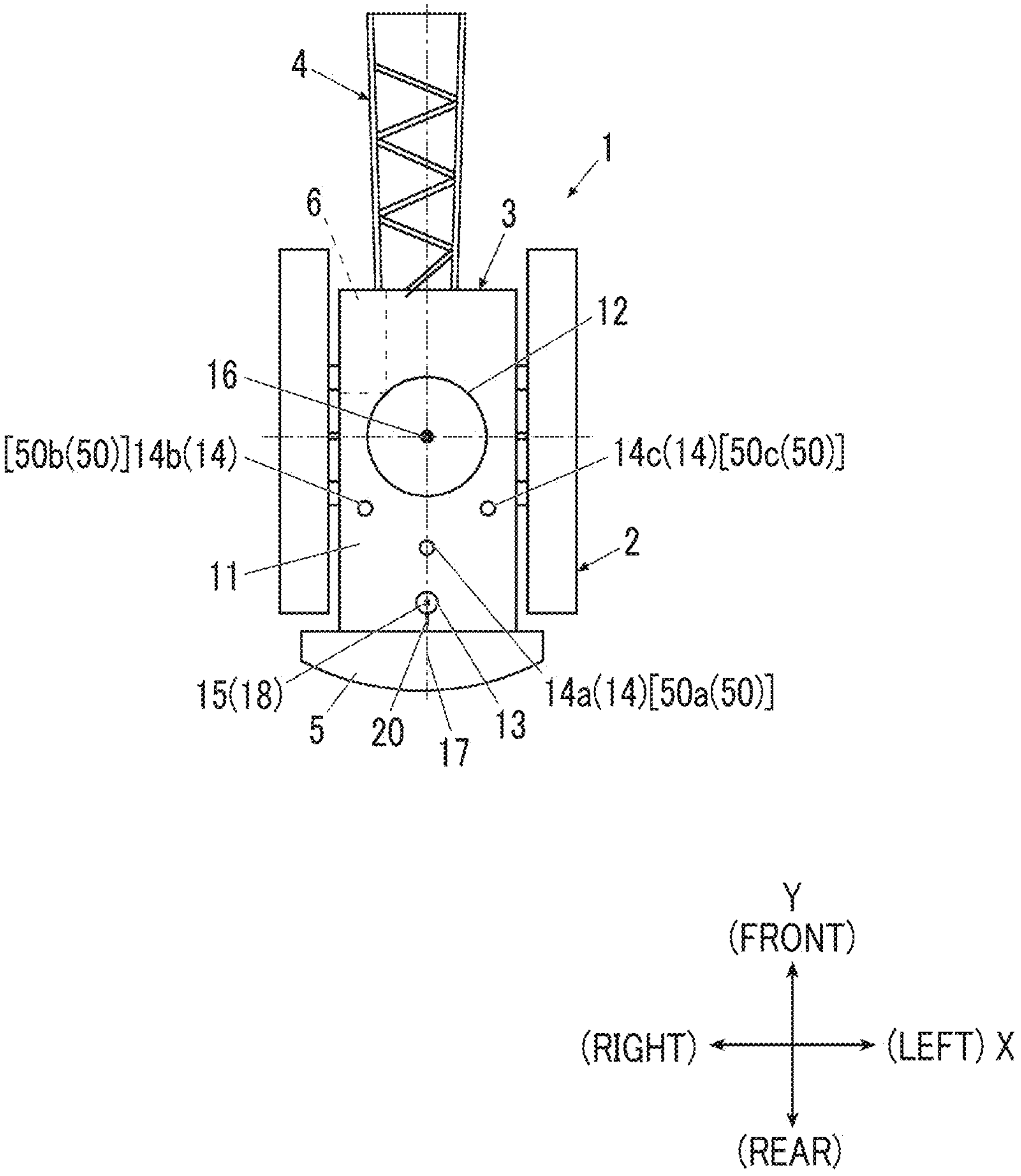
FIG. 2 is a back surface view of the crane shown in FIG. 1.

FIG. 1 is a side surface view of a crane 1 as a work machine. FIG. 2 is a back surface view of the crane 1 shown in FIG. 1.

As shown in FIG. 1, the crane 1 is a so-called mobile crawler crane. Specifically, the crane 1 includes a self-propelled crawler-type lower traveling body 2 and a rotating platform 3 mounted on the lower traveling body 2 in a turnable manner.

In the following, front-rear and left-right directions viewed from an occupant of the crane 1 will be described as front-rear and left-right directions of the crane 1. Further, unless otherwise specified, in principle, the front-rear direction of the crane 1 will be described assuming that there is a state where the lower traveling body 2 matches the rotating platform 3 in the front-rear direction (referred to as a reference posture). Further, an up-down direction of the crane 1 in a state where the crane 1 is placed on a horizontal plane may be referred to as a vertical direction.

A boom 4 is attached to a front side of the rotating platform 3 in a derricking manner. A counterweight 5 that balances weights of the boom 4 and a suspended load is attached to a rear portion of the rotating platform 3. A cabin 6 in which an operator is seated to manipulate the crane 1 is disposed on a right front portion of the rotating platform 3.

A derricking winch (not shown) winds or unwinds a wire rope (derricking rope) 7 to perform a derricking operation of the boom 4. One end of a hoisting rope 8 is connected to a hook 10 at a tip (upper end) of the boom 4, and the hook 10 is suspended from the tip of the boom 4. The other end of the hoisting rope 8 is wound around a hoisting winch (not shown) on the rotating platform 3, and the hook 10 is raised and lowered by the drive of the hoisting winch.

As shown in FIGS. 1 and 2, a sensor 13 (for example, all-around LiDAR capable of measuring 360°) as a position measurement device and a plurality of position identifying members 14 (first to third position identifying members 14*a* to 14*c* as objects) are detachably attached, at a position avoiding a turning bearing 12, to a main frame 11 located on a lower surface side of the rotating platform 3. The plurality of position identifying members 14 (first to third position identifying members 14*a* to 14*c*) are detachably attached to be screwed into screw holes 50 (installation portions 50*a* to 50*c*) formed in the main frame 11, respectively. The installation portion is not limited to the screw hole 50 screwed to the position identifying member 14, and may have any other structure as long as the position identifying member 14 is detachably attached. The sensor 13 can measure 360° around a sensor center axis 15 extending in a vertical direction on a lower surface of the main frame 11. The sensor 13 emits a laser beam to an external space of the crane 1 from a space generated between the lower traveling body 2 and the rotating platform 3 to measure position information of a surrounding object (not only position information of one point of the surrounding object, but also three-dimensional shape information including the position and the shape (posture) of the surrounding object) over a wide range. Further, the sensor center axis 15 is a rotation axial center parallel to an axial center of a turning center 16 of the rotating platform 3. Further, the first to third position identifying members 14*a* to 14*c* are round bar-shaped members having the same shape and protrude from a surface of the main frame 11. Due to the protrusion of the first to third position identifying members 14*a* to 14*c* from the surface of the main frame 11, the limitations of a transportation width and a transportation height are easily affected in a case where the crane is transported as it is. However, since the plurality of position identifying members 14 are detachable and can be removed during transportation, the limitations of the transportation width and the transportation height are hardly affected. In a case where the sensor 13 is installed on the lower surface of the main frame 11, the sensor 13 is not easily removed from the main frame 11, but is installed later at a time of assembling of the crane 1. Thus, correcting a deviation of the sensor 13 is of great importance. Further, although the position identifying member 14 is not limited to the round bar-shaped member having the same shape, the round bar-shaped member having the same shape is preferable in order to accurately measure a position of the center axis of the position identifying member 14 with the sensor 13.

As shown in FIG. 2, the sensor 13 is disposed at a position near a rear end portion of the main frame 11 of the rotating platform 3 and on a center line 17 extending in the front-rear direction through the turning center 16 of the rotating platform 3. In FIG. 2, the sensor center axis (rotation axial center) 15 is set as a reference position 18 of the sensor 13, and a state where a posture line 20 indicating a posture of the sensor 13 is located along the center line 17 extending in the front-rear direction through the turning center 16 of the rotating platform 3 is set as a reference posture 19 of the sensor 13. The sensor 13 may be detachably attached to a lower surface of a base weight 5A on which the counterweight 5 is mounted. Since some of the base weights 5A are removed from the main frame 11 in a case where the crane 1 is transported, the deviation of the sensor 13 is likely to occur. Thus, correcting the deviation of the sensor 13 is of great importance. Further, in a case where the sensor 13 is installed on the lower surface of the base weight 5A, the sensor 13 is located closer to a rear end side of the crane 1, as compared with the case where the sensor 13 is installed on the main frame 11, which makes it easier for the sensor 13 to measure a periphery of a rear side of the crane 11. Further, the sensor 13 may be installed on the counterweight 5 or the rotating platform 3 since an installation position of the sensor 13 can be changed according to a measurement target around the crane 1.

Further, as shown in FIG. 2, the first position identifying member 14*a* is disposed on the center line 17 extending in the front-rear direction through the turning center 16 of the rotating platform 3, and at a position between the sensor 13 and the turning bearing 12. Further, the second position identifying member 14*b* and the third position identifying member 14*c* are in a line-symmetrical relationship with respect to the center line 17 extending in the front-rear direction through the turning center 16 of the rotating platform 3, and are disposed at a position between the first position identifying member 14*a* and the turning bearing 12. The first to third position identifying members 14*a* to 14*c* are disposed to form an isosceles triangle having the first position identifying member 14*a* as an apex. Further, since the position identifying members 14 (first to third position identifying members 14*a* to 14*c*) are detachably attached to the main frame 11, it is possible to remove the position identifying member 14 from the crane 1 at a time of disassembling/assembling or cleaning of the crane 1, and thus, damage to the position identifying member 14 can be prevented. Further, since the position identifying members 14 (first to third position identifying members 14*a* to 14*c*) are detachably attached to the main frame 11, with the removal of the position identifying member 14 from the main frame 11 after the deviation of the sensor 13 is corrected, there is no obstruction in the measurement around the sensor 13 during crane work, and there is no constraint on designing the crane 1 (for example, a design constraint in which a gap between a crawler of the lower traveling body 2 and the rotating platform 3 is increased by an amount of the position identifying member 14).

Configuration of Peripheral Monitoring System for Work Machine

Figure 3:
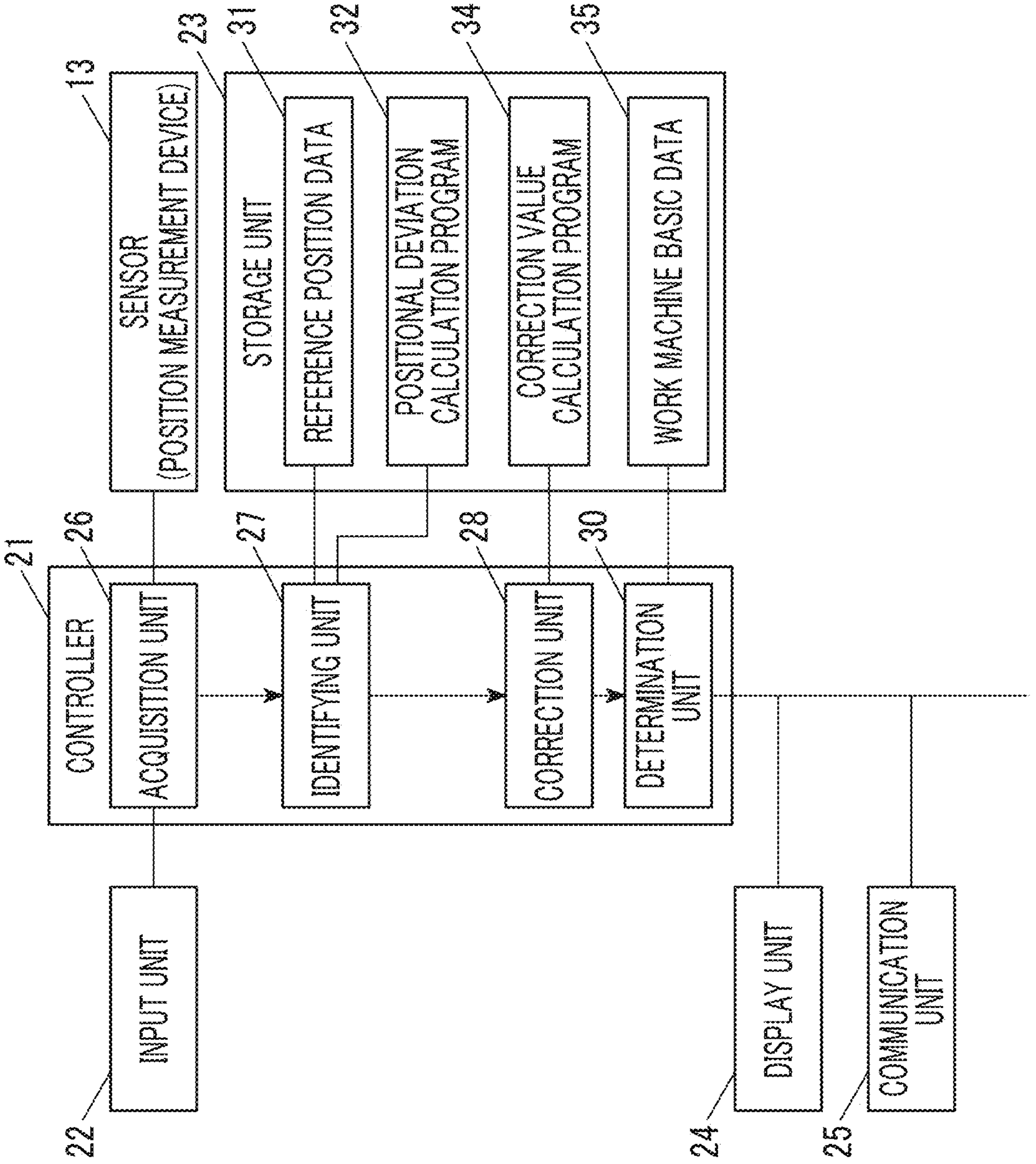
FIG. 3 is a block diagram showing a peripheral monitoring system for the crane.

FIG. 3 is a block diagram showing the peripheral monitoring system for the crane 1 as the work machine. As shown in FIG. 3, in addition to the configuration of the crane 1 described above, the peripheral monitoring system for the crane includes a controller 21, an input unit 22, a sensor 13 (position measurement device), a storage unit 23, a display unit 24, and a communication unit 25.

The controller 21 is configured of, for example, a central processing unit (CPU), and controls the operation of each part of the crane 1. The controller 21 includes a function of an electronic control unit (ECU) and is disposed on the rotating platform 3. Specifically, the controller 21 operates the crane 1 based on an operation input or the like of the operator from the input unit 22, expands various programs stored in advance in the storage unit 23, reads out various types of data, and executes various types of processing using the expanded program or various types of readout data.

The controller 21 is capable of functioning as an acquisition unit 26, an identifying unit 27, a correction unit 28, and a determination unit 30.

Figure 4A:
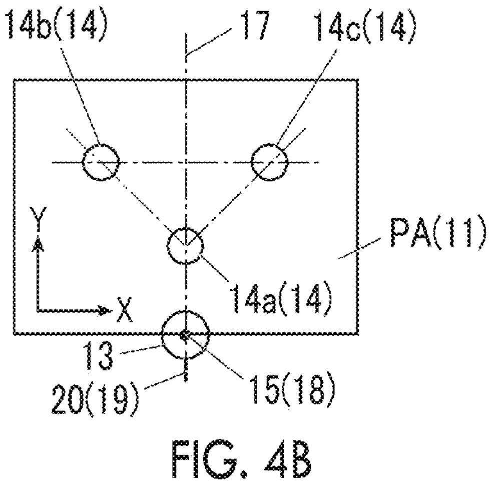
FIGS. 4A, 4B, and 4C are diagrams showing a relationship between a position measurement device and a position identifying member.
Figure 4B:
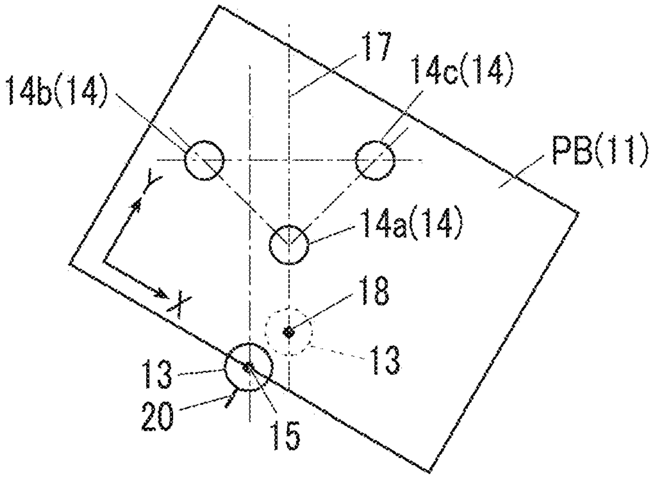

The acquisition unit 26 acquires the position information of the first to third position identifying members 14*a* to 14*c* on a sensor coordinate plane PB, based on the measurement results of the first to third position identifying members 14*a* to 14*c* by the sensor 13 (refer to FIGS. 4A and 4B). The sensor coordinate plane PB matches a crane coordinate plane (work machine coordinate plane) PA in a case where the sensor 13 does not have the positional deviation and the posture deviation. Further, as shown in FIG. 4B, the sensor coordinate plane PB does not match the crane coordinate plane PA in a case where the sensor 13 has the positional deviation and the posture deviation.

The identifying unit 27 identifies the position and the posture of the sensor 13 based on the position information of the first to third position identifying members 14*a* to 14*c* with respect to the sensor 13, which is acquired by the acquisition unit 26. Here, the identification means that a positional deviation $\Delta X$, $\Delta Y$ of the sensor 13 and a posture deviation $\Delta\Theta$ of the sensor 13 on the crane coordinate plane PA are calculated by a positional deviation calculation program 32 expanded from the storage unit 23, using the position information (position information on the sensor coordinate plane PB) of the first to third position identifying members 14*a* to 14*c* with respect to the sensor 13, which is acquired by the acquisition unit 26, and reference position data 31 of the sensor 13 read out from the storage unit 23 (refer to FIG. 4C). It is not always necessary to identify both the position and the posture. For example, in a case where only the positional deviation is corrected, only the position may be identified.

Figure 4C:
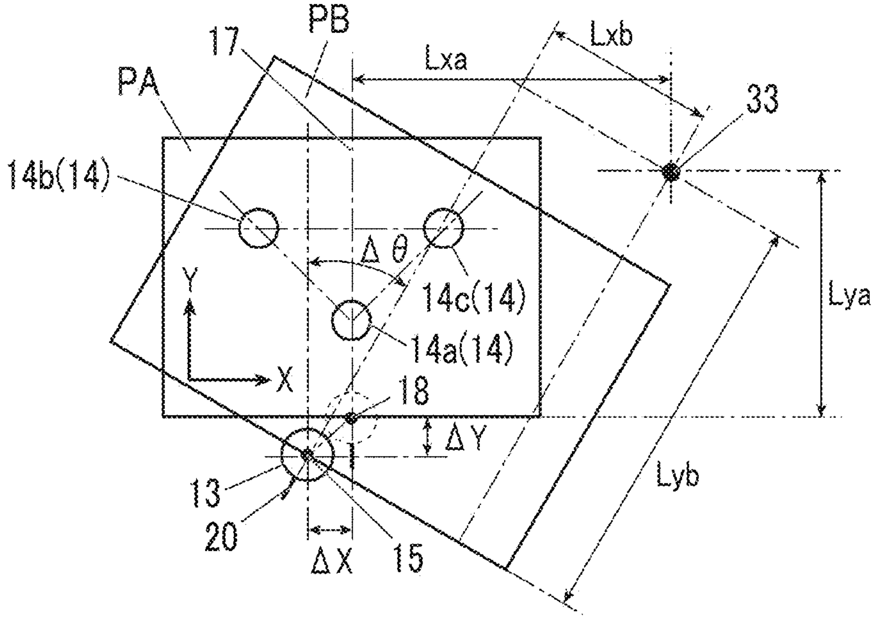

In the correction unit 28, a correction value calculation program 34 expanded from the storage unit 23 corrects the position information (position information on the sensor coordinate plane PB) of an external object 33 of the crane 1, which is detected by the sensor 13, to the position information (position information with respect to the reference position 18 and the reference posture 19 of the sensor 13) on the crane coordinate plane PA, using numerical values of the positional deviation ΔX, ΔY and the posture deviation ΔΘ of the sensor 13 (refer to FIG. 4C).

The determination unit 30 compares the position information of the external object 33 corrected by the correction unit 28 with work machine basic data 35 (off-limits area data) recorded in advance in the storage unit 23 to determine whether or not the external object 33 may be an obstacle.

The input unit 22 is various operation buttons operated by the operator, a keyboard, or the like, and is capable of inputting a signal relating to the operation of the crane 1 to the controller 21. In a case where a display surface is a touch panel, the input unit 22 includes an input button displayed on the touch panel. Further, in a case where the controller 21 is operated from an external information terminal, the input unit 22 includes the external information terminal.

An all-around LiDAR capable of measuring 360° around the reference position 18 is used as the sensor 13 (position measurement device), and the sensor 13 can measure the position and the posture (shape) of the position identifying member 14 (14*a* to 14*c*) and the position and the posture (shape) of the external object 33 of the crane 1. In other words, an all-around LiDAR capable of measuring 360° around the sensor 13 is used, and the position and posture (shape) of the position identifying member 14 (14*a* to 14*c*) and the position and the posture (shape) of the external object 33 of the crane 1 can be measured. As the sensor 13, any sensor that has a ranging function as in the all-around LiDAR can be applied. For example, any sensor such as a millimeter wave, a stereo camera, or an ultrasonic sensor can be used. However, a LiDAR sensor can detect a shape with high accuracy. In order to measure the periphery of the work machine at 360°, the sensor is not limited to a sensor that performs sensing while rotating with a rotation center as in LiDAR, and a sensor that simultaneously measures the whole periphery of 360° may be used.

The storage unit 23 is a memory configured of, for example, a random-access memory (RAM) or a read-only memory (ROM), stores various programs and pieces of data, and also functions as a work area of the controller 21. The storage unit 23 of the present embodiment records the reference position data 31, the positional deviation calculation program 32, the correction value calculation program 34, and the work machine basic data 35.

The reference position data 31 includes the reference position 18 and the reference posture 19 of the sensor 13 on the crane coordinate plane PA, and the position data of the first to third position identifying members 14*a* to 14*c*.

In a case where the sensor 13 has the positional deviation and the posture deviation from the reference position 18 and the reference posture 19 at a time of installation (refer to FIG. 4B), the positional deviation calculation program 32 can calculate the positional deviation ΔX, ΔY and the posture deviation ΔΘ of the sensor 13 on the crane coordinate plane PA, using the position information of the first to third position identifying members 14*a* to 14*c* on the sensor coordinate plane PB and the reference position data 31 of the sensor 13 read out from the storage unit 23.

The correction value calculation program 34 can correct the position information (position information on the sensor coordinate plane PB) of the external object 33 of the crane 1 detected by the sensor 13 to the position information (position information with respect to the reference position 18 and the reference posture 19 of the sensor 13) on the crane coordinate plane PA, using the numerical values of the positional deviation ΔX, ΔY and the posture deviation ΔΘ of the sensor 13.

The work machine basic data 35 includes a width dimension of the lower traveling body 2 of the crane 1 in the left-right direction, a length dimension of the lower traveling body 2 of the crane 1 in the front-rear direction, a turning radius of the rotating platform 3, an off-limits area (area data on the crane coordinate plane PA), and the like.

The display unit 24 is, for example, a liquid-crystal display, an organic electroluminescence display, or another display, and displays various types of information based on a display signal input from the controller 21. The display unit 24 may be a touch panel that also serves as a part of the input unit 22.

The communication unit 25 is, for example, a communication device capable of transmitting and receiving various types of information to and from an external information terminal (not shown).

Relationship Between Sensor and Position Identifying Member

FIGS. 4A, 4B, and 4C are diagrams showing a relationship between the sensor 13 (position measurement device) and the position identifying member 14 (first to third position identifying members 14*a* to 14*c*).

FIG. 4A is a diagram schematically showing a part of FIG. 2. In FIG. 4A, in a case where a plane parallel to the lower surface of the main frame 11 of the crane 1 is the crane coordinate plane PA, the sensor center axis 15 of the sensor 13 is located at the reference position 18 on the crane coordinate plane PA, and the posture line 20 of the sensor 13 extends from the reference position 18 in a −Y direction along the center line 17. The sensor 13 on the crane coordinate plane PA shown in FIG. 4A is attached in a state of having no positional deviation and no posture deviation with respect to the reference position 18.

Further, FIG. 4B is a diagram showing a state where the sensor 13 has the positional deviation with respect to the reference position 18 and has the posture deviation with respect to the reference posture 19. In FIG. 4B, a direction perpendicular to a direction in which the posture line 20 of the sensor 13 extends is an X direction, a direction opposite to the direction in which the posture line 20 of the sensor 13 extends (direction perpendicular to the X direction) is a Y direction, and this X-Y coordinate plane is used as the sensor coordinate plane PB. The sensor 13 may have the positional deviation or the posture deviation due to an impact or vibration received by the crane 1. Further, the sensor 13 may have the positional deviation or the posture deviation at a time of disassembling/reassembling of the crane 1.

Further, FIG. 4C is a diagram showing a state where the sensor coordinate plane PB of FIG. 4B is overlapped with the crane coordinate plane PA of FIG. 4A such that the first to third position identifying members 14*a* to 14*c* are respectively aligned. As shown in FIG. 4C, with the overlapping of the crane coordinate plane PA of FIG. 4A with the sensor coordinate plane PB of FIG. 4B and projection of the position and the posture of the sensor 13 shown in FIG. 4B onto the crane coordinate plane PA, it is possible to obtain the positional deviation ΔX, ΔY with respect to the reference position 18 of the sensor 13 and to obtain the posture deviation ΔΘ with respect to the reference posture 19 of the sensor 13. Further, as shown in FIG. 4C, position information (Lxb,Lyb) on the sensor coordinate plane PB obtained by detecting the external object 33 of the crane 1 with the sensor 13 can be corrected to position information (Lxa,Lya)

on the crane coordinate plane PA, using the positional deviation ΔX, ΔY of the sensor 13 and the posture deviation ΔΘ of the sensor 13.

Flowchart of Obstacle Detection

Figure 5:
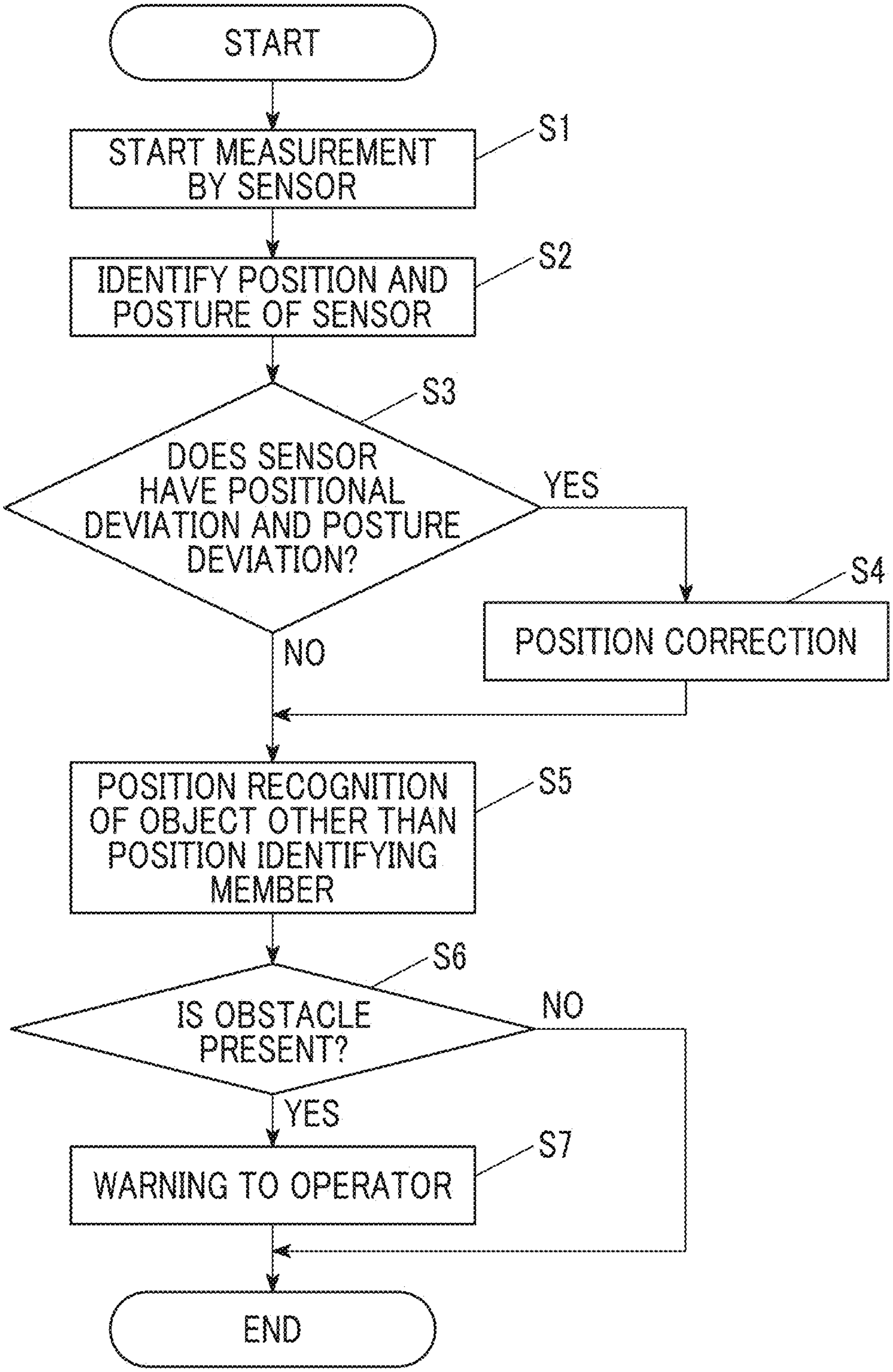
FIG. 5 is a flowchart of obstacle detection using the position measurement device.

FIG. 5 is a flowchart of obstacle detection using the sensor 13 (position measurement device) of the crane 1 according to the present embodiment.

In FIG. 5, the obstacle detection using the sensor 13 of the crane 1 is started by an input of a start signal from the input unit 22 by the operator. The controller 21 operates the sensor 13 based on the start signal from the input unit 22, the sensor 13 starts the all-around (360°) measurement, and the sensor 13 measures the first to third position identifying members 14*a* to 14*c* and the external object 33 of the crane 1 (step S1).

Next, the controller 21 identifies the position and the posture of the sensor 13 from detection results of the position identifying members 14 (first to third position identifying members 14*a* to 14*c*) (step S2). In the identification of the position and the posture of the sensor 13, the positional deviation calculation program 32 expanded from the storage unit 23 calculates the positional deviation ΔX, ΔY of the sensor 13 and the posture deviation ΔΘ of the sensor 13 on the crane coordinate plane PA, using the position information (position information on the sensor coordinate plane PB) of the first to third position identifying members 14*a* to 14*c* with respect to the sensor 13, which is acquired by the acquisition unit 26, and the reference position data 31 of the sensor 13 read out from the storage unit 23.

Next, the controller 21 compares the data of the positional deviation ΔX, ΔY of the sensor 13 and the posture deviation ΔΘ of the sensor 13, which are calculated in step S2, with the reference position data 31 of the sensor 13 to determine whether or not the sensor 13 has the positional deviation and the posture deviation (step S3).

Next, in the controller 21, in a case where the sensor 13 is determined to have the positional deviation and the posture deviation in step S3, the correction unit 28 uses the correction value calculation program 34 expanded from the storage unit 23 to correct the position information (position information on the sensor coordinate plane PB) of the position identifying member 14, which is detected by the sensor 13, to the position information (position information with respect to the reference position 18 and the reference posture 19 of the sensor 13) on the crane coordinate plane PA, using the numerical values of the position deviation ΔX, ΔY and posture deviation ΔΘ of the sensor 13 (step S4).

Further, in a case where the sensor 13 is determined not to have the positional deviation and the posture deviation in step S3, the controller 21 executes position recognition of an object other than the position identifying member 14 (external object 33) on the crane coordinate plane PA (step S5). Further, the controller 21 executes the position recognition of the object other than the position identifying member 14 (external object 33) on a crane coordinate plane subjected to sensor coordinate plane correction in step S4 (step S5).

Next, in the controller 21, the position information of the external object 33 corrected by the correction unit 28 is compared with the work machine basic data 35 (off-limits area data) recorded in advance in the storage unit 23, and the determination unit 30 determines whether or not the external object 33 may be an obstacle (step S6).

Next, in a case where the determination unit 30 determines that there is an obstacle, the controller 21 displays the presence of the obstacle and position data of the obstacle on the display unit 24, warns the operator (step S7), and ends the obstacle measurement work. Further, in a case where the determination unit 30 determines that there is no obstacle, the controller 21 ends the obstacle measurement work.

Effect of Present Embodiment

The peripheral monitoring system for the crane (work machine) 1 according to the present embodiment can easily correct the deviation of the sensor 13 (effect corresponding to the invention of claim 1). Further, in the peripheral monitoring system for the crane 1 according to the present embodiment, since the position identifying member 14 is detachably installed on the crane 1, with the removal of the position identifying member 14 from the crane 1 at the time of disassembling/assembling or cleaning of the crane 1, it is possible to prevent damage to the position identifying member 14. Further, with the removal of the position identifying member 14 from the crane 1 during transportation, the transportation width and the transportation height of the crane 1 are hardly affected.

Further, in the peripheral monitoring system for the crane (work machine) 1 according to the present embodiment, in a case where an end portion side on which the counterweight is disposed is a rear side, the position identifying member 14 is disposed on a front side of the sensor 13. Therefore, the sensor 13 can detect an obstacle behind the crane without being obstructed by the position identifying member 14.

Further, in the peripheral monitoring system for the crane (work machine) 1 according to the present embodiment, since the position measurement device 13 can rotate 360° around the rotation axial center, it is possible to measure the deviation of the sensor 13 and to detect the obstacle behind the crane.

Further, in the peripheral monitoring system for the crane (work machine) 1 according to the present embodiment, the position identifying members 14 serving as landmarks are installed at a plurality of locations of the crane 1, and a measurement range of the position measurement device includes the plurality of position identifying members 14. Therefore, the identification accuracy of the position and the posture of the sensor 13 is improved.

Further, in the peripheral monitoring system for the crane (work machine) 1 according to the present embodiment, since the sensor 13 is detachably installed on the crane 1, with the removal of the sensor 13 from the crane 1 at the time of disassembling/assembling or cleaning of the crane 1, it is possible to prevent damage to the sensor 13.

Further, in the peripheral monitoring system for the crane (work machine) 1 according to the present embodiment, since the sensor 13 is installed in the main frame 11, even though there is the deviation of the sensor 13 due to the removal of the sensor 13 from the main frame at the time of disassembling/assembling of the crane 1 during transportation, it is possible to easily correct the deviation of the sensor 13.

Further, in the peripheral monitoring system for the crane (work machine) 1 according to the present embodiment, since the plurality of position identifying members 14 have the same shape, the measurement accuracy of the position identifying member 14 by the sensor 13 is improved, and thus the identification accuracy of the position and the posture of the sensor 13 is improved.

Further, in the peripheral monitoring system for the crane (work machine) 1 according to the present embodiment, since the plurality of position identifying members 14 all have different shapes, in a case where a state before the sensor 13 has the deviation and a state after the sensor 13 has the deviation are discriminated by the overlapping of the position identifying members 14, it is possible to easily overlap the position identifying members 14 in the state before the sensor 13 has the deviation with the position identifying members 14 in the state after the sensor 13 has the deviation, and thus, the deviation of the sensor 13 can be efficiently corrected.

First Modification Example

Figure 6A:
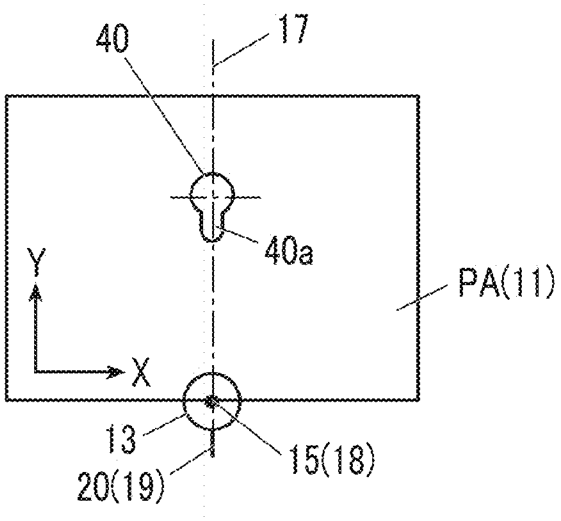
FIGS. 6A and 6B are diagrams showing a modification example of the relationship between the position measurement device and the position identifying member.

FIG. 6A is a diagram showing a first modification example of the position identifying member 14 according to the embodiment described above. As shown in FIG. 6A, only one position identifying member 40 according to the first modification example is detachably attached on the center line 17 of the lower surface (crane coordinate plane PA) of the main frame 11 and at a position between the sensor 13 and a turning bearing (not shown). The position identifying member 40 is formed with an overhanging protrusion 40*a* extending linearly on the center line 17 from a side surface of a round bar-shaped body toward the sensor 13.

In such a position identifying member 40 according to the present modification example, in a case where the sensor 13 has the positional deviation and the posture deviation, with overlapping of the overhanging protrusion 40*a* of the position identifying member 40 on the sensor coordinate plane PB with the overhanging protrusion 40*a* of the position identifying member 40 on the crane coordinate plane PA, it is possible to detect the positional deviation and the posture deviation of the sensor 13 as shown in FIG. 4C. With the application of the position identifying member 40 according to the present modification example to a peripheral monitoring system for a work machine, there are few objects that block the laser beam of the sensor 13 as compared with the peripheral monitoring system for the work machine according to the embodiment described above, and thus, the measurement range of the sensor 13 is widened. In the present modification example, the position identifying member 40 may be provided with three overhanging protrusions 40*a* radially (one on each side of the overhanging protrusions 40*a* shown in FIG. 6A).

Second Modification Example

Figure 6B:
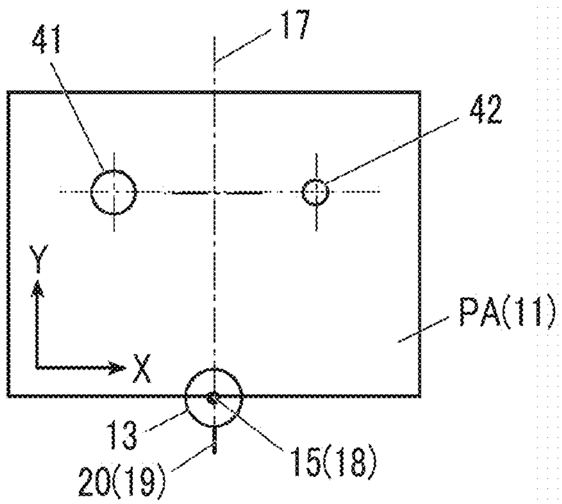

FIG. 6B is a diagram showing a second modification example of the position identifying member 14 according to the embodiment described above. As shown in FIG. 6B, position identifying members 41 and 42 according to the second modification example are round bar-shaped protrusions, and are disposed at line-symmetrical positions with respect to the center line 17 of the lower surface (crane coordinate plane PA) of the main frame 11, respectively. The position identifying member 41 located on a left side in the drawing of FIG. 6B is formed to have a larger outer diameter than that of the position identifying member 42.

In the present modification example as described above, since the plurality of position identifying members 14 all have different shapes, in a case where the sensor 13 has the deviation (positional deviation, posture deviation), it is possible to easily overlap the position identifying members 41 and 42 on the sensor coordinate plane PB with the position identifying members 41 and 42 on the crane coordinate plane PA. Therefore, it is possible to easily discriminate the deviation between the sensor 13 on the sensor coordinate plane PB and the sensor 13 on the crane coordinate plane PA, and thus, the deviation of the sensor 13 can be efficiently corrected.

Other Application Examples

In the present invention, the type of the crane is not particularly limited. In addition to a mobile crane such as a crawler crane, a wheel crane, and a truck crane, any crane such as a port crane, an overhead crane, a portal crane, an unloader, or a stationary crane may be used.

Further, the present invention is not limited to the application to the crane as the work machine, and can be applied to other work machines as long as the machines are work machines. For example, the present invention can be applied to work machines such as a forklift, an excavator car, an asphalt finisher, a soil improvement machine, and a foundation machine.

Further, in the present invention, the installation position of the sensor 13 is not limited to the lower surface side of the rotating platform 3 or the lower surface side of the counterweight 5, and may be disposed on an upper surface side of the rotating platform 3.

Further, the position identifying member is not limited to the configurations of the embodiment or each modification example described above. Any position identifying member may be employed as long as the positional deviation and the posture deviation of the sensor 13 can be detected as shown in FIG. 4C with the overlapping of the position identifying member on the sensor coordinate plane PB with the position identifying member on the crane coordinate plane PA.

In addition, the details shown in the embodiment described above can be changed as appropriate within the scope of the present invention.

It should be understood that the invention is not limited to the above-described embodiment, but may be modified into various forms on the basis of the spirit of the invention. Additionally, the modifications are included in the scope of the invention.

What is claimed is:

1. A peripheral monitoring system for a work machine comprising:

a position measurement sensor configured to measure a position of a position identifying member, the position identifying member provided on the work machine;

a controller that acquires position information of the position identifying member with the position measurement sensor and that identifies a position of an object based on acquired position information of the position identifying member, wherein the position measurement sensor is configured to measure a position of the position identifying member that is different from the position measurement sensor, and the position identifying member is detachably installed on the work machine.

2. The peripheral monitoring system for a work machine according to claim 1, wherein the controller also identifies a posture of the object based on the acquired position information.

3. The peripheral monitoring system for a work machine according to claim 1, wherein the work machine includes a counterweight, and in a case where an end portion side of the work machine on which the counterweight of the work machine is disposed is a rear side, the position identifying member is disposed on a front side of the position measurement sensor.

4. The peripheral monitoring system for a work machine according to claim 1, wherein the position identifying member is detachably installed at a plurality of locations of the work machine, a measurement range of the position measurement sensor includes positions of the position identifying members at the plurality of locations, the position measurement sensor is configured to measure a position of each of the position identifying members installed at the plurality of locations, the controller acquires the position information of each of the position identifying members installed at the plurality of locations by the position measurement sensor, and the controller identifies the position of the position measurement sensor based on acquired position information of each of the position identifying members at the plurality of locations acquired by the controller.

5. The peripheral monitoring system for a work machine according to claim 3, wherein the position measurement sensor is capable of measuring the position of the position identifying member in a range of 360° around the position measurement sensor.

6. The peripheral monitoring system for a work machine according to claim 1, wherein the position measurement sensor is detachably installed on the work machine.

7. The peripheral monitoring system for a work machine according to claim 6, wherein the position measurement sensor is installed in a main frame of a rotating platform.

8. The peripheral monitoring system for a work machine according to claim 1, further comprising:

an installation portion to which the position identifying member is detachably installed.

9. The peripheral monitoring system for a work machine according to claim 4, wherein the work machine includes a counterweight, and in a case where an end portion side of the work machine on which the counterweight is disposed is a rear side, the position identifying members installed at the plurality of locations are disposed on a front side of the position measurement sensor.

10. The peripheral monitoring system for a work machine according to claim 1, further comprising:

a memory configured to store reference position data, the reference position data including a reference position of the position measurement sensor and position data of the position identifying member, wherein the controller calculates a positional deviation of the position measurement sensor by comparing the position information acquired by the controller and the reference position data stored in the memory.

* * * * *